(12) United States Patent
Ito

(10) Patent No.: US 10,884,307 B2
(45) Date of Patent: Jan. 5, 2021

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/448,329

(22) Filed: Jun. 21, 2019

(65) Prior Publication Data

US 2019/0391426 A1 Dec. 26, 2019

(30) Foreign Application Priority Data

Jun. 22, 2018 (JP) ................................. 2018-118641

(51) Int. Cl.
| | |
|---|---|
| *G02F 1/136* | (2006.01) |
| *G02F 1/133* | (2006.01) |
| *G03B 21/00* | (2006.01) |
| *G02F 1/1368* | (2006.01) |
| *G02F 1/1362* | (2006.01) |
| *G02F 1/1333* | (2006.01) |

(52) U.S. Cl.
CPC ...... *G02F 1/1368* (2013.01); *G02F 1/133345* (2013.01); *G02F 1/136286* (2013.01); *G03B 21/006* (2013.01); *G02F 2201/123* (2013.01)

(58) Field of Classification Search
CPC .................................................. G03B 21/006
See application file for complete search history.

(56) References Cited

U.S. PATENT DOCUMENTS

| | | | |
|---|---|---|---|
| 2010/0033645 A1 | 2/2010 | Nakagawa | |
| 2014/0285411 A1 | 9/2014 | Tamura et al. | |
| 2016/0042681 A1 | 2/2016 | Tamura et al. | |
| 2016/0351600 A1* | 12/2016 | Moriwaki | ............. G02F 1/1368 |
| 2016/0377910 A1* | 12/2016 | Ito | .................... G02F 1/136227 257/72 |
| 2017/0102596 A1* | 4/2017 | Sugimoto | ......... G02F 1/136213 |

(Continued)

FOREIGN PATENT DOCUMENTS

| | | |
|---|---|---|
| JP | 2010-039209 A | 2/2010 |
| JP | 2010-039212 A | 2/2010 |

(Continued)

*Primary Examiner* — Moazzam Hossain
*Assistant Examiner* — Omar F Mojaddedi
(74) *Attorney, Agent, or Firm* — Oliff PLC

(57) ABSTRACT

An electro-optical device includes a base member, a pixel electrode, a first insulating layer arranged above the base member, a first capacitor arranged above the first layer and including a first electrode and a second electrode arranged above the second electrode, a second insulating layer arranged above the first capacitor, a second capacitor arranged above the second layer and including a third electrode and a fourth electrode arranged above the third electrode, a third layer insulating arranged above the second capacitor, and a transistor arranged between the base member and the first layer and including a source electrode, a drain electrode, and a gate electrode. The second electrode is coupled to the drain electrode via the third electrode, and the third electrode is coupled to the pixel electrode via the second electrode.

3 Claims, 8 Drawing Sheets

(56) References Cited

U.S. PATENT DOCUMENTS

2018/0067368 A1   3/2018  Izawa et al.
2018/0149937 A1   5/2018  Nakajima

FOREIGN PATENT DOCUMENTS

| JP | 2012-181308 A | 9/2012 |
| JP | 2014-186125 A | 10/2014 |
| JP | 3199692 U | 9/2015 |
| JP | 2016-128226 A | 7/2016 |
| JP | 2018-040969 A | 3/2018 |
| JP | 2018-084724 A | 5/2018 |

* cited by examiner

ELECTRO-OPTICAL DEVICE AND ELECTRONIC APPARATUS

The present application is based on, and claims priority from JP Application Serial Number 2018-118641, filed Jun. 22, 2018, the disclosure of which is hereby incorporated by reference herein in its entirety.

BACKGROUND

1. Technical Field

The present disclosure relates to an electro-optical device and an electronic apparatus.

2. Related Art

There are known electro-optical devices such as a liquid crystal display device used in an electronic apparatus such as a projector. For example, the electro-optical device described in Japanese Utility Model No. 3,199,692 includes a pixel electrode, a transistor, and a first retention capacitor and a second retention capacitor electrically coupled to the pixel electrode and the transistor. Here, the first retention capacitor includes a first capacitance electrode coupled to a constant potential, a second capacitance electrode coupled to the pixel electrode and the transistor, and a first dielectric layer disposed between the first capacitance electrode and the second capacitance electrode. The second retention capacitor includes the second capacitance electrode common to the first retention capacitor, a third capacitance electrode coupled to a constant potential, and a second dielectric layer disposed between the second capacitance electrode and the third capacitance electrode.

However, in the electro-optical device described in Japanese Utility Model No. 3,199,692, the second capacitance electrode serves as an electrode for both the first retention capacitor and the second retention capacitor, and thus a structure for coupling to the transistor and the pixel electrode must be disposed to the second capacitance electrode, causing a corresponding decrease in electrostatic capacity of the first retention capacitor or the second retention capacitor. As a result, in the related art, there is a problem that it is difficult to increase the electrostatic capacity of the retention capacitor while decreasing a surface area of the retention capacitor.

SUMMARY

An aspect of an electro-optical device according to the present disclosure includes a base member, a pixel electrode, a first layer having insulating properties and arranged between the base member and the pixel electrode, a second layer having insulating properties and arranged between the pixel electrode and the first layer, a third layer having insulating properties and arranged between the pixel electrode and the second layer, a first capacitor arranged between the first layer and the second layer and including a first electrode and a second electrode arranged between the second layer and the first electrode, a second capacitor arranged between the second layer and the third layer and including a third electrode and a fourth electrode arranged between the third layer and the third electrode, a transistor arranged between the base member and the first layer and including a source electrode, a drain electrode, and a gate electrode, wherein the second electrode is coupled to the drain electrode via the third electrode, and the third electrode is coupled to the pixel electrode via the second electrode.

DESCRIPTION OF EXEMPLARY EMBODIMENTS

Figure 1:
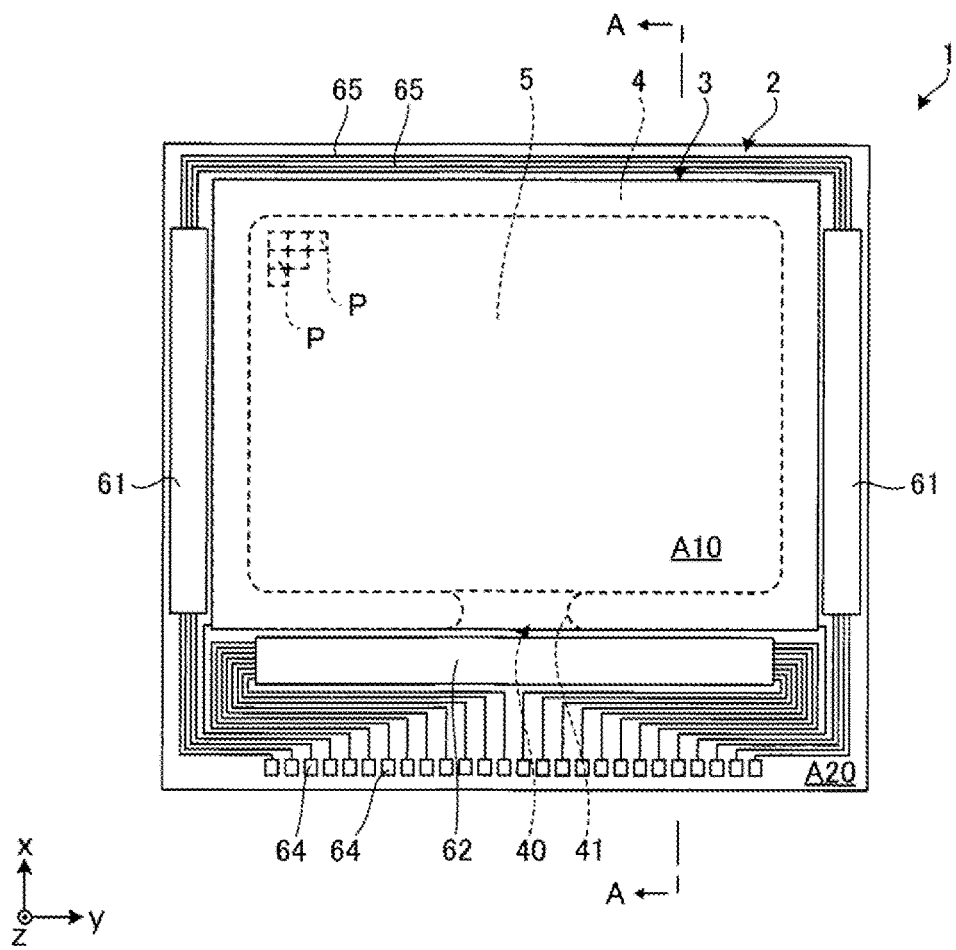
FIG. 1 is a plan view of an electro-optical device according to an exemplary embodiment.

Hereinafter, preferred exemplary embodiments of the present disclosure will be described with reference to the accompanying drawings. Note that, in the drawings, dimensions and scales of each portion are differed from actual dimensions and scales as appropriate, and some portions are also schematically illustrated to make them easy to be understood. In addition, the scope of the present disclosure is not limited to these embodiments unless otherwise stated to limit the present disclosure specifically in the following descriptions.

1. Electro-Optical Apparatus 1-1. Basic Configuration

Figure 2:
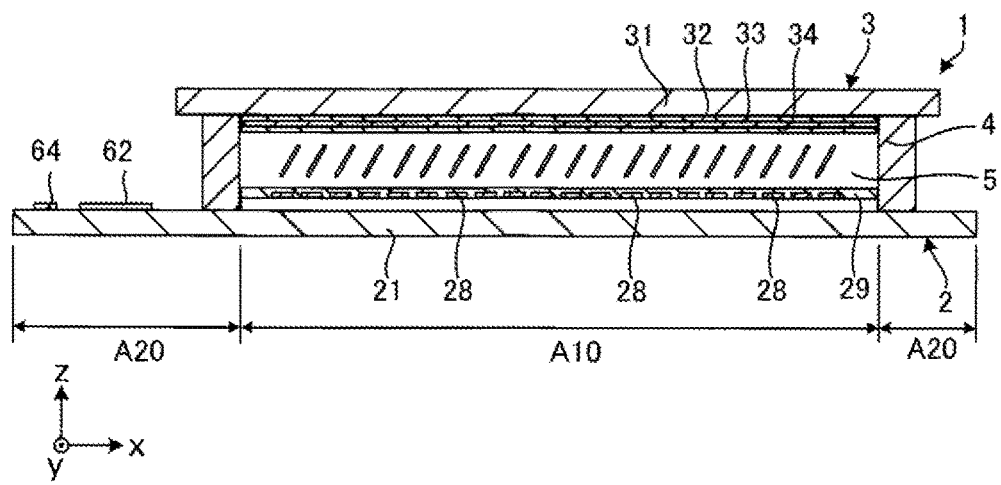
FIG. 2 is a cross-sectional view of the electro-optical device according to the exemplary embodiment.

FIG. 1 is a plan view of an electro-optical device 1 according to an exemplary embodiment. FIG. 2 is a cross-sectional view of the electro-optical device 1 according to the exemplary embodiment. The electro-optical device 1 illustrated in FIG. 1 and FIG. 2 is a transmissive active-matrix liquid crystal display device that uses a Thin Film Transistor (TFT) as a switching element. A basic configuration of the electro-optical device 1 is described below based on FIG. 1 and FIG. 2. Note that, in the following, for the convenience of explanation, descriptions are given using the x axis, the y axis, and the z axis, orthogonal to one another and illustrated in FIG. 1 and FIG. 2, as appropriate. Further, FIG. 2 is a cross-sectional view along line A-A in FIG. 1.

As illustrated in FIG. 1 and FIG. 2, the electro-optical device 1 includes an element substrate 2 having translucency, a counter substrate 3 having translucency and arranged facing the element substrate 2, a sealing member 4 having a frame-like shape and arranged between the element substrate 2 and the counter substrate 3, and a liquid crystal layer 5 surrounded by the element substrate 2, the counter substrate 3, and the sealing member 4.

Note that, as illustrated in FIG. 1, the electro-optical device 1 forms a quadrilateral shape in a plan view when viewed in a z axis direction parallel with a thickness direction of the element substrate 2, but the shape in the plan view of the electro-optical device 1 is not limited to this shape, and may be a circular shape or the like, for example. Further, in the following, a plan view from the z axis direction parallel with the thickness direction of the element substrate 2 is simply referred to as "plan view".

As illustrated in FIG. 1, the element substrate 2 has a size encompassing the counter substrate 3 in a plan view. As illustrated in FIG. 2, the element substrate 2 includes a base member 21, a plurality of pixel electrodes 28, and an alignment film 29. The base member 21 is constituted of a flat plate having light transmitting and insulating properties. The pixel electrodes 28 are respectively formed of a transparent conductive material such as Indium Tin Oxide (ITO) or Indium Zinc Oxide (IZO), for example. The alignment film 29 is positioned closest to the liquid crystal layer 5 in the element substrate 2, and aligns liquid crystal molecules of the liquid crystal layer 5. Examples of the constituent material of the alignment film 29 include polyimide, silicon oxide, and the like.

Further, while not illustrated in FIG. 1 and FIG. 2, a transistor 23, a storage capacitor 20, and the like are arranged between the base member 21 and the pixel electrodes 28. Note that the transistor 23, the storage capacitor 20, and the like will be described in detail later in Section 1-3, "Detailed Description of Element Substrate".

As illustrated in FIG. 2, the counter substrate 3 includes a base member 31, an insulating layer 32, a common electrode 33, and an alignment film 34. The base member 31, the insulating layer 32, the common electrode 33, and the alignment film 34 are stacked in this order. The alignment film 34 is positioned closest to the liquid crystal layer 5.

The base member 31 is constituted of a flat plate having light transmitting and insulating properties. The base member 31 is formed of glass or quartz, for example. The common electrode 33 is stacked on the base member 31 via the insulating layer 32 formed using a light transmitting insulating material. The common electrode 33 is formed of a transparent conductive material such as ITO or IZO, for example. Further, the alignment film 34 aligns the liquid crystal molecules of the liquid crystal layer 5. Examples of the constituent material of the alignment film 34 include polyimide, silicon oxide, and the like.

The sealing member 4 is formed using an adhesive including various types of curable resins such as epoxy resin, for example. The sealing member 4 is affixed to each of the element substrate 2 and the counter substrate 3. The liquid crystal layer 5 is arranged in a region surrounded by the sealing member 4, the element substrate 2, and the counter substrate 3. Note that, an injection port 41 for injecting a liquid crystal material including liquid crystal molecules is formed in a portion of the sealing member 4, and is sealed by a sealing member 40 formed using various resin materials.

The liquid crystal layer 5 includes liquid crystal molecules having positive or negative dielectric anisotropy. The liquid crystal layer 5 is interposed between the element substrate 2 and the counter substrate 3 such that the liquid crystal molecules are in contact with both the alignment film 29 and the alignment film 34. An alignment of the liquid crystal molecules changes in accordance with a voltage applied to the liquid crystal layer 5. By modulating the light, the liquid crystal layer 5 is allowed to perform gradation display in accordance with the applied voltage.

Further, as illustrated in FIG. 1, two scanning line driving circuits 61 and one signal line driving circuit 62 are arranged on a surface of the element substrate 2, on the counter substrate 3 side. A plurality of external terminals 64 are arranged on the surface of the element substrate 2, on the counter substrate 3 side. The external terminals 64 are coupled with wirings 65 guided from each of the scanning line driving circuits 61 and the signal line driving circuit 62.

Such an electro-optical device 1 overlaps with the liquid crystal layer 5 in a plan view, and includes a display area A10 that displays an image and the like, and a peripheral area A20 surrounding the display area A10 in a plan view. The display area A10 includes a plurality of pixels P arranged in a matrix pattern. In one pixel P is arranged one pixel electrode 28. The scanning line driving circuits 61, the signal line driving circuit 62, and the like are arranged in the peripheral area A20.

Further, a driving scheme of the electro-optical device 1 may include, but is not specifically limited to, a Twisted Nematic (TN) mode and a Vertical Alignment (VA) mode, for example.

1-2. Electrical Configuration

Figure 3:
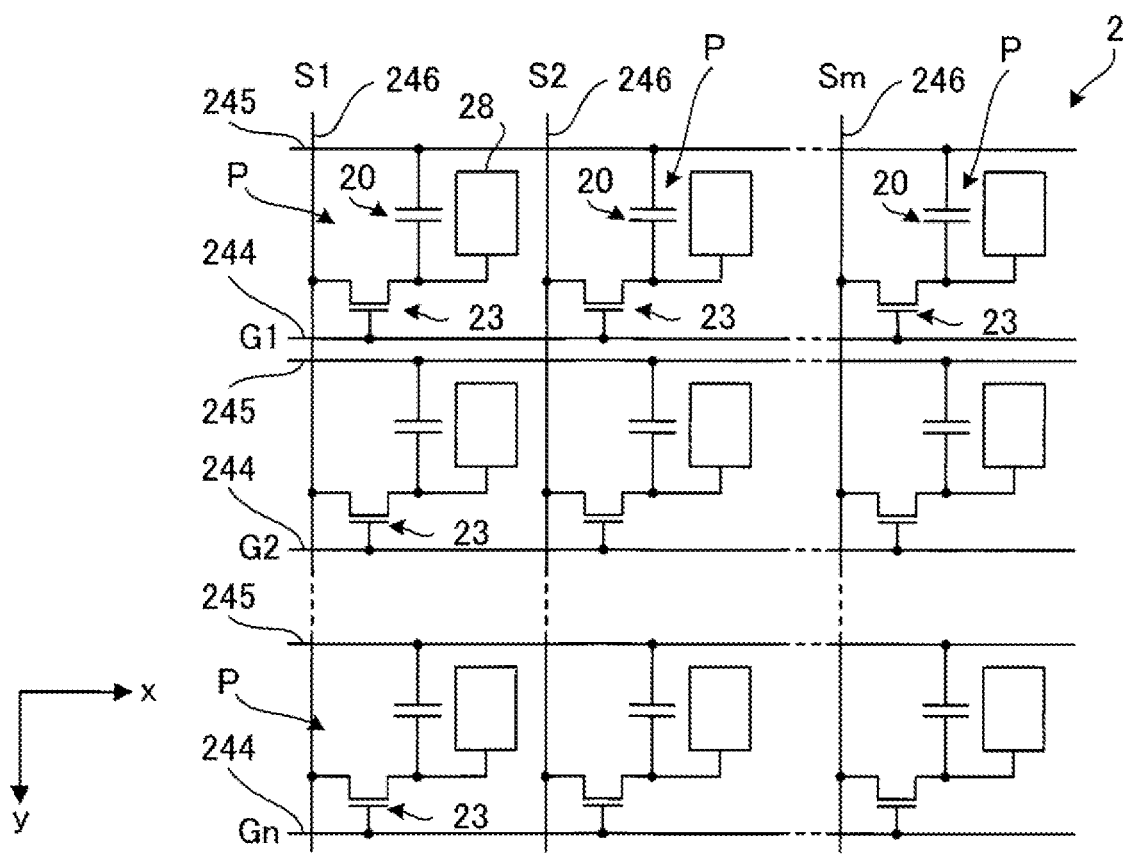
FIG. 3 is an equivalent circuit diagram illustrating an electrical configuration of an element substrate of the exemplary embodiment.

FIG. 3 is an equivalent circuit diagram illustrating an electrical configuration of the element substrate 2 of the exemplary embodiment. As illustrated in FIG. 3, on the element substrate 2 are formed n scanning lines 244, m signal lines 246, and n capacitance lines 245. Note that both n and m are integers of 2 or more. The transistor 23 serving as a switching element is arranged correspondingly to each of the intersections between the n scanning lines 244 and the m signal lines 246. The transistor 23 is a TFT as described later and, while not illustrated in FIG. 3, includes a source electrode, a drain electrode, and a gate electrode.

The n scanning lines 244 illustrated in FIG. 3 are aligned at equal intervals in the y axis direction, and extend in the x axis direction. The scanning line 244 is electrically coupled to the gate electrode of the transistor 23. Further, the n scanning lines 244 are electrically coupled to the scanning line driving circuits 61 illustrated in FIG. 1. On the n scanning lines 244, scanning signals G1, G2, . . . , Gn are line-sequentially supplied from the scanning line driving circuits 61 to the n scanning lines 244.

The m signal lines 246 illustrated in FIG. 3 are aligned at equal intervals in the x axis direction, and extend in the y axis direction. The signal line 246 is electrically coupled to the source electrode of the transistor 23. Further, the m signal lines 246 are electrically coupled to the signal line driving circuit 62 illustrated in FIG. 1. On the m signal lines 246, image signals S1, S2, . . . , Sm are line-sequentially supplied from the signal line driving circuit 62 illustrated in FIG. 1 to the signal lines 246.

The n scanning lines 244 and the m signal lines 246 are mutually insulated, and form a lattice-like shape in a plan view. An area surrounded by two adjacent scanning lines 244 and two adjacent signal lines 246 corresponds to the pixel P. In one pixel P is formed one pixel electrode 28. Note that the drain electrode of the transistor 23 is electrically coupled to the pixel electrode 28.

The n capacitance lines 245 are aligned at equal intervals in the y axis direction, and extend in the x axis direction. Further, the n capacitance lines 245 are insulated from the plurality of signal lines 246 and the plurality of scanning lines 244, and are formed apart from these lines. A fixed potential such as a ground potential, for example, is applied to the capacitance lines 245. In addition, the storage capacitor 20 is arranged in parallel with a liquid crystal capacitor, between the capacitance line 245 and the pixel electrode 28, to prevent leakage of charges held in the liquid crystal capacitor.

The scanning signals G1, G2, . . . , Gn become sequentially active and n scanning lines 244 are sequentially selected, then the transistor 23 coupled to the selected scanning line 244 is turned to an on-state. Then, the image signals S1, S2, . . . , Sm having magnitudes commensurate with the gradation to be displayed are transmitted, via the m signal lines 246, to the pixel P corresponding to the selected scanning line 244, and are then applied to the pixel electrodes 28. According to this, a voltage in accordance with the gradation to be displayed to be applied to the liquid crystal capacitor formed between the pixel electrode 28 and the common electrode 33 of the counter substrate 3 illustrated in FIG. 2, and the alignment of the liquid crystal molecules varies in accordance with the applied voltage. Further, the applied voltage is held by the storage capacitor 20. Such a variation in the alignment of the liquid crystal molecules causes the light to be modulated, to thus enable gradation display.

1-3. Detailed Description of Element Substrate

Figure 4:
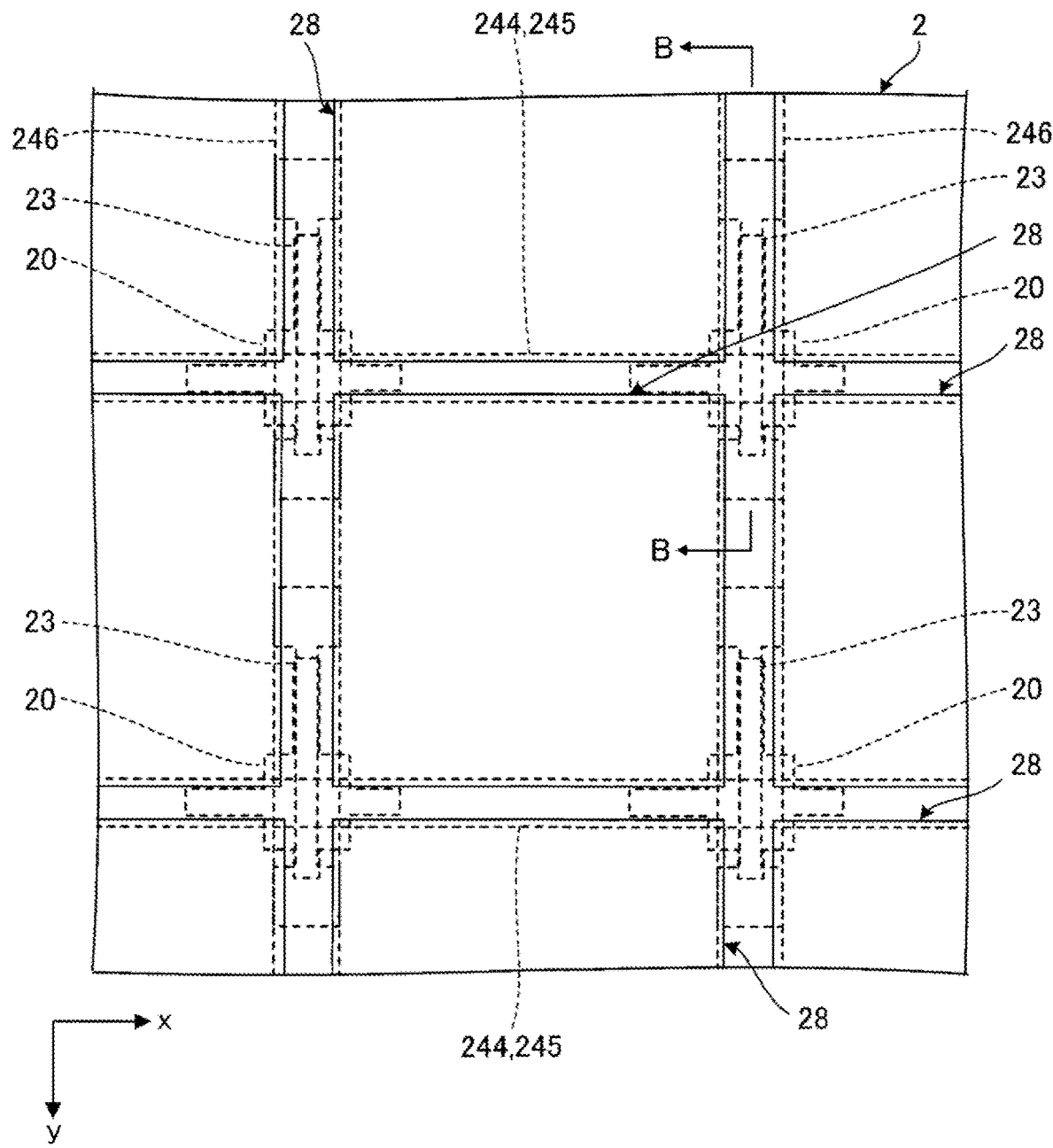
FIG. 4 is a plan view illustrating a portion of the element substrate of the exemplary embodiment.
Figure 5:
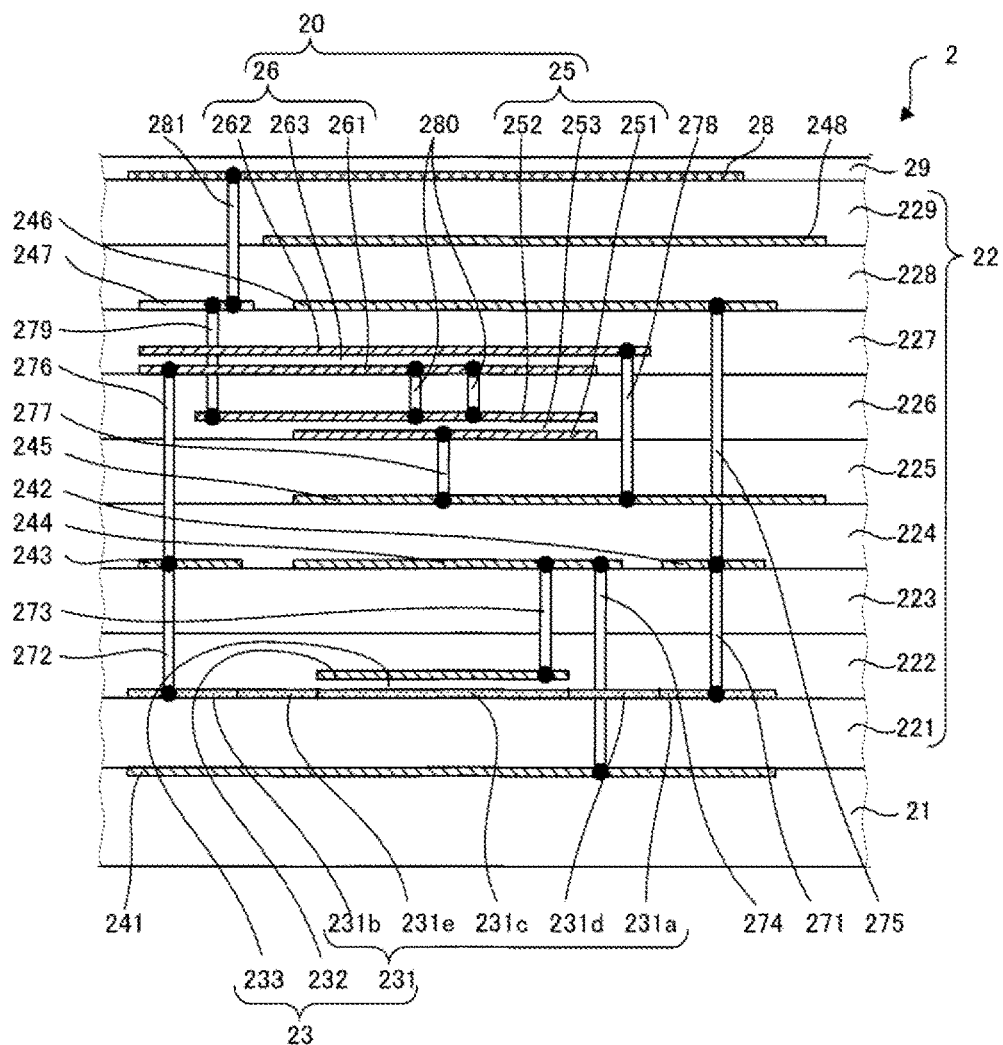
FIG. 5 is a cross-sectional view schematically illustrating a portion of the element substrate of the exemplary embodiment.

FIG. 4 is a plan view illustrating a portion of the element substrate 2 of the exemplary embodiment. FIG. 5 is a cross-sectional view schematically illustrating a portion of the element substrate 2 of the exemplary embodiment. The element substrate 2 illustrated in FIG. 4 and FIG. 5 includes the base member 21, a dielectric body 22, the plurality of transistors 23, a light-shielding body 241, a plurality of wirings 242, a plurality of wirings 243, the plurality of scanning lines 244, the plurality of capacitance lines 245, the plurality of signal lines 246, a plurality of wirings 247, a shield layer 248, the plurality of storage capacitors 20, the plurality of image electrodes 28, a plurality of contact units 271 to 281, and the alignment film 29. Each unit of the element substrate 2 is sequentially described below. Note that the capacitance line 245 is an example of "reference potential wiring". Further, FIG. 5 is a cross-sectional view along line B-B in FIG. 4.

The base member 21 illustrated in FIG. 5 is a flat plate formed using glass or quartz, for example. A plurality of the light-shielding bodies 241 are arranged on the surface of the base member 21, on the pixel electrode 28 side. The plurality of light-shielding bodies 241 overlap the transistor 23 and are arranged in a matrix pattern in a plan view. In the exemplary embodiment, the light-shielding body 241 not only has a light shielding property, but also conductivity. The light-shielding body 241 is coupled to the scanning line 244 via the contact unit 274 that penetrates insulating layers 221, 222, 223, and also functions as a gate electrode in coordination with a gate electrode 232 of the transistor 23 described later. Examples of the constituent materials of the light-shielding body 241 and the contact unit 274 respectively include a metal such as tungsten (W), titanium (Ti), chromium (Cr), iron (Fe), and aluminum (Al), an alloy, a metal silicide, or the like.

Note that the light-shielding body 241 may function as a gate electrode. In this case, the light-shielding body 241 may be formed of a material having insulating properties. Further, the light-shielding body 241 may be arranged in a recessed portion disposed to the base member 21. The recessed portion is formed by a damascene method, for example. Further, the contact unit 274 may be integrally configured with the scanning line 244. Further, the other contact units 271 to 273 and 275 to 281, similar to the contact unit 274, may also be formed using a material having conductivity, and may be integrally configured with a coupled layer or wiring having conductivity.

Further, the dielectric body 22 is arranged on the surface of the base member 21 on the pixel electrode 28 side, covering the plurality of the light-shielding bodies 241. Here, the dielectric body 22 is arranged between the base member 21 and the plurality of pixel electrodes 28. The dielectric body 22 includes the plurality of insulating layers 221, 222, 223, 224, 225, 226, 227, 228, 229, and these layers are arranged side-by-side from the base member 21 side to the pixel electrode 28 side, in this order. These layers are respectively constituted of a silicon oxide film formed by thermal oxidation, chemical vapor deposition (CVD), or the like, for example.

The plurality of transistors 23 are arranged between the insulating layer 221 and the insulating layer 222. The plurality of wirings 242, the plurality of wirings 243, and the plurality of scanning lines 244 are arranged between the insulating layer 223 and the insulating layer 224. The plurality of capacitance lines 245 are arranged between the insulating layer 224 and the insulating layer 225. A first capacitor 25 of the storage capacitor 20 is arranged between the insulating layer 225 and the insulating layer 226. A second capacitor 26 of the storage capacitor 20 is arranged between the insulating layer 226 and the insulating layer 227. The plurality of signal lines 246 and the plurality of wirings 247 are arranged between the insulating layer 227 and the insulating layer 228. The shield layer 248 is arranged between the insulating layer 228 and the insulating layer 229.

Here, the plurality of wirings 242, the plurality of wirings 243, the plurality of scanning lines 244, the plurality of capacitance lines 245, the plurality of signal lines 246, the plurality of wirings 247, and the shield layer 248 are each formed by film deposition using a metal such as aluminum, for example. Further, as illustrated in FIG. 4, the transistor 23 and the storage capacitor 20 are arranged overlapping at an intersecting portion where the signal line 246 and the scanning line 244 intersect.

As illustrated in FIG. 5, the transistor 23 includes a semiconductor layer 231, the gate electrode 232, and a gate insulating film 233.

The semiconductor layer 231 is arranged on the insulating layer 221. The semiconductor layer 231 includes a source area 231a, a drain area 231b, a channel area 231c, a first Lightly Doped Drain (LDD) area 231d, and a second LDD area 231e. The source area 231a functions as a source electrode. The drain area 231b functions as a drain electrode. The channel area 231c is positioned between the source area 231a and the drain area 231b. The first LDD area 231d is positioned between the channel area 231c and the source area 231a. The second LDD area 231e is positioned between the channel area 231c and the drain area 231b. The semiconductor layer 231 is, for example, formed by film deposition of polysilicon, and is doped with impurities that increase conductivity in areas excluding the channel area 231c. Here, an impurity concentration in the first LDD area 231d and the second LDD area 231e is lower than an impurity concentration in the source area 231a and the drain area 231b. Note that the contact unit 271 may be treated as a "source electrode" and the contact unit 272 may be treated as a "drain electrode". Further, at least one of the first LDD area 231d and the second LDD area 231e, in particular, the first LDD area 231d, may be omitted.

The gate electrode 232 overlaps with the channel area 231c of the semiconductor layer 231 described above, in a plan view. The gate electrode 232 is, for example, formed by film deposition of polysilicon, and doped with impurities that increase conductivity. The gate insulating film 233 is interposed between the gate electrode 232 and the channel area 231c. The gate insulating film 233, similar to the layers constituting the dielectric body 22, is constituted of a silicon oxide film formed by thermal oxidation, CVD, or the like, for example.

The source area 231a of the transistor 23 described above is coupled to the wiring 242 via the contact unit 271 that penetrates the insulating layers 222, 223. The wiring 242 is coupled to the signal line 246 via the contact unit 275 that penetrates the insulating layers 224, 225, 226. The drain area 231b is coupled to the wiring 243 via the contact unit 272 that penetrates the insulating layers 222, 223. The wiring 243 is coupled to the second capacitor 26 of the storage capacitor 20 via the contact unit 276 that penetrates the insulating layers 224, 225, 226. The gate electrode 232 is coupled to the scanning line 244 via the contact unit 273 that penetrates the insulating layers 222, 223.

The storage capacitor 20 includes the first capacitor 25 and the second capacitor 26. The first capacitor 25 is arranged between the insulating layer 225 and the insulating layer 226. The first capacitor 25 includes a first electrode 251, a second electrode 252, and a dielectric layer 253. The first electrode 251 is arranged on the insulating layer 225. The first electrode 251 is coupled to the scanning line 245 via the contact unit 277 that penetrates the insulating layer 225. The second electrode 252 is arranged between the first electrode 251 and the insulating layer 226. The second electrode 252 is coupled to the wiring 247 via the contact unit 279 that penetrates the insulating layers 226, 227. The wiring 247 is coupled to the pixel electrode 28 via the contact unit 281 that penetrates the insulating layers 228, 229. The dielectric layer 253 is arranged between the first electrode 251 and the second electrode 252.

On the other hand, the second capacitor 26 is arranged between the insulating layer 226 and the insulating layer 227. In the exemplary embodiment, the second capacitor 26 includes a portion that overlaps with the first capacitor 25 in a plan view. The second capacitor 26 includes a third electrode 261, a fourth electrode 262, and a dielectric layer 263. The third electrode 261 is arranged on the insulating layer 226. The third electrode 261 is coupled to the second electrode 252 of the first capacitor 25 described above via the contact unit 280 that penetrates the insulating layer 226. The third electrode 261 is coupled to the wiring 243 via the contact unit 276 that penetrates the insulating layers 224, 225, 226. The fourth electrode 262 is arranged between the third electrode 261 and the insulating layer 227. The fourth electrode 262 is coupled to the capacitance line 245 via the contact unit 278 that penetrates the insulating layers 225, 226. The dielectric layer 263 is arranged between the third electrode 261 and the fourth electrode 262.

The first electrode 251, the second electrode 252, the third electrode 261, and the fourth electrode 262 are each formed by film deposition of, for example, a metal such as tungsten (W), titanium (Ti), chromium (Cr), iron (Fe), and aluminum (Al), an alloy, a metal silicide, or the like. Further, the dielectric layers 253, 263 are each constituted of a silicon oxide film formed by thermal oxidation, CVD, or the like, for example.

In the storage capacitor 20 described above, the second electrode 252 of the first capacitor 25 is coupled to the drain area 231b of the transistor 23 via the third electrode 261 of the second capacitor 26. Further, the third electrode 261 of the second capacitor 26 is coupled to the pixel electrode 28 via the second electrode 252 of the first capacitor 25. The coupling configuration of the first capacitor 25 and the second capacitor 26, and the transistor 23 and the pixel electrode 28 is described in detail below.

Figure 6:
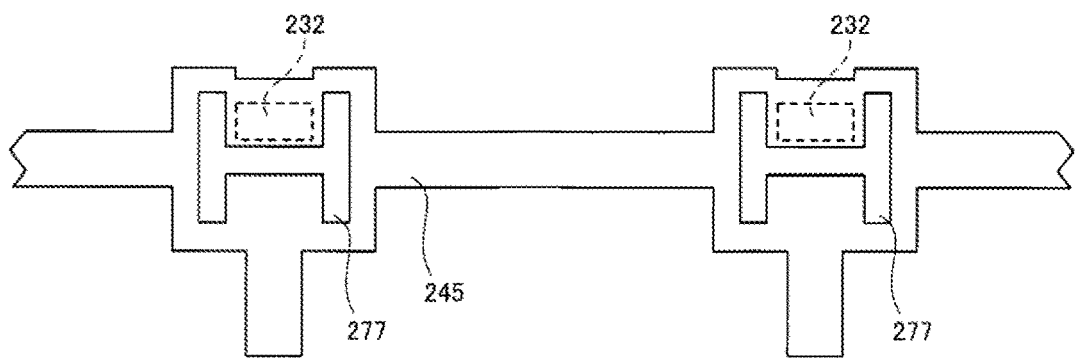
FIG. 6 is a plan view illustrating a contact unit on a reference potential wiring of the exemplary embodiment.

FIG. 6 is a plan view illustrating the contact unit 277 on the capacitance line 245 of the exemplary embodiment. As illustrated in FIG. 6, a plurality of the contact units 277 are arranged on the capacitance line 245. The contact unit 277 penetrates the insulating layer 225 as described above. Here, the capacitance line 245 includes a portion overlapping with the gate electrode 232 of the transistor 23 in a plan view, and a width of the portion is wider than the width of the other portions. The contact unit 277 is arranged on the portion, and forms a shape that does not overlap with the gate electrode 232, in a plan view. In the exemplary embodiment, the contact unit 277 forms an H-shape in a plan view. By increasing a surface area of the contact unit 277 in this way, there is an advantage that the electrostatic capacity of the storage capacitor 20 can be increased by using a portion of the insulating layer 225 surrounding the contact unit 277 as well.

Note that the contact unit 277 may have a shape overlapping the gate electrode 232 in a plan view. Further, the plan view shape of the contact unit 277 is not limited to an H-shape, and may be, for example, a polygon, such as a quadrilateral or a pentagon.

Figure 7:
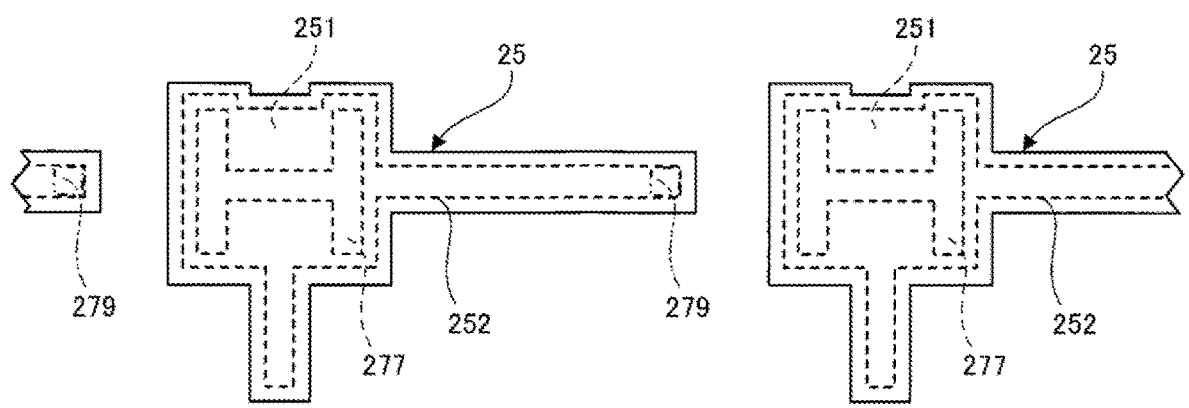
FIG. 7 is a plan view illustrating a first capacitor of the exemplary embodiment.

FIG. 7 is a plan view illustrating the first capacitor 25 of the exemplary embodiment. As illustrated in FIG. 7, the first electrode 251 of the first capacitor 25 forms a shape overlapping the contact unit 277 in a plan view. Note that the plan view shape of the first capacitor 25 is not limited to the shape illustrated, and is as desired.

Figure 8:
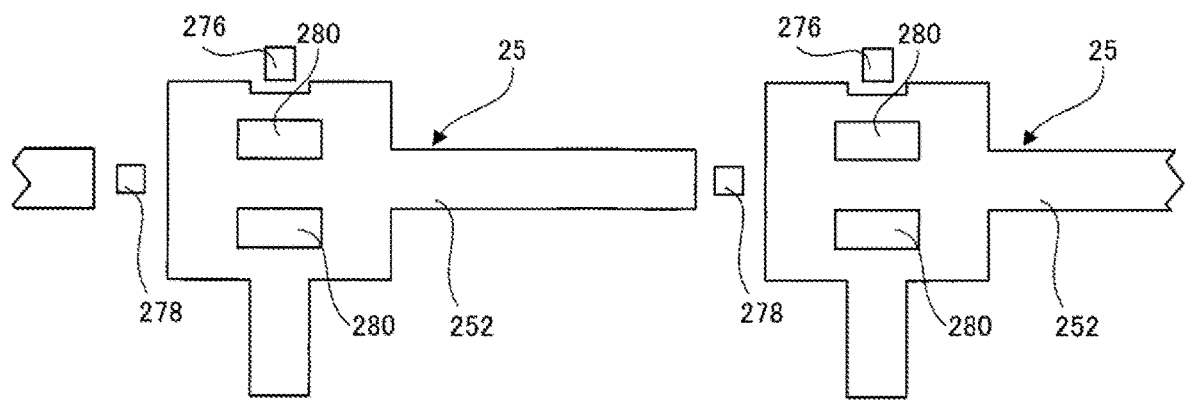
FIG. 8 is a plan view illustrating the contact unit and the like on the first capacitor of the exemplary embodiment.

FIG. 8 is a plan view illustrating the contact unit 280 on the first capacitor 25 of the exemplary embodiment. As illustrated in FIG. 8, the contact unit 280 is arranged on the second electrode 252 of the first capacitor 25. The contact unit 280 penetrates the insulating layer 226 as described above. In the exemplary embodiment, the contact unit 280 forms a shape split into two, in a plan view. By increasing a surface area of the contact unit 280 in this way, there is an advantage that the electrostatic capacity of the storage capacitor 20 can be increased by using a portion of the insulating layer 226 surrounding the contact unit 280 as well.

Further, the plan view shape of the contact unit 280 is not limited to the shape illustrated, and may be, for example, an H-shape similar to that of the contact unit 277 or a polygon, such as a quadrilateral or a pentagon.

In addition to the contact unit 280, the contact units 276, 278 penetrate the insulating layer 226 as described above. The contact units 276 and 278 are arranged separated from the first capacitor 25, as illustrated in FIG. 8.

Figure 9:
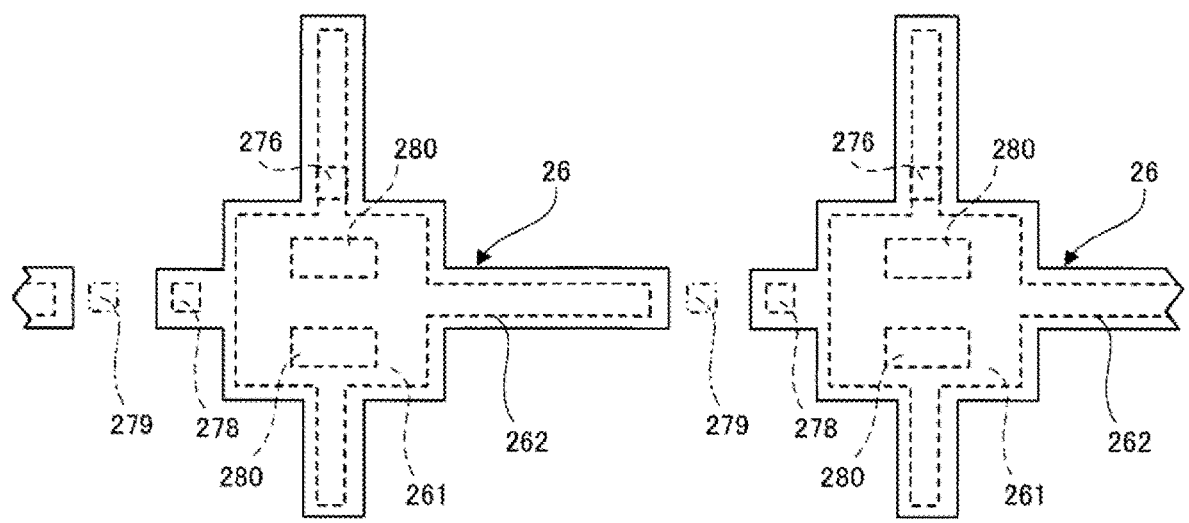
FIG. 9 is a plan view illustrating a second capacitor of the exemplary embodiment.

FIG. 9 is a plan view illustrating the second capacitor 26 of the exemplary embodiment. As illustrated in FIG. 9, the third electrode 261 of the second capacitor 26 forms a shape that overlaps the contact units 276, 280, but does not overlap the contact units 278, 279, in a plan view. The fourth electrode 262 of the second capacitor 26 forms a shape overlapping the contact unit 278, in a plan view. Note that the plan view shape of the second capacitor 26 is not limited to the shape illustrated, and may be arbitrary.

Figure 10:
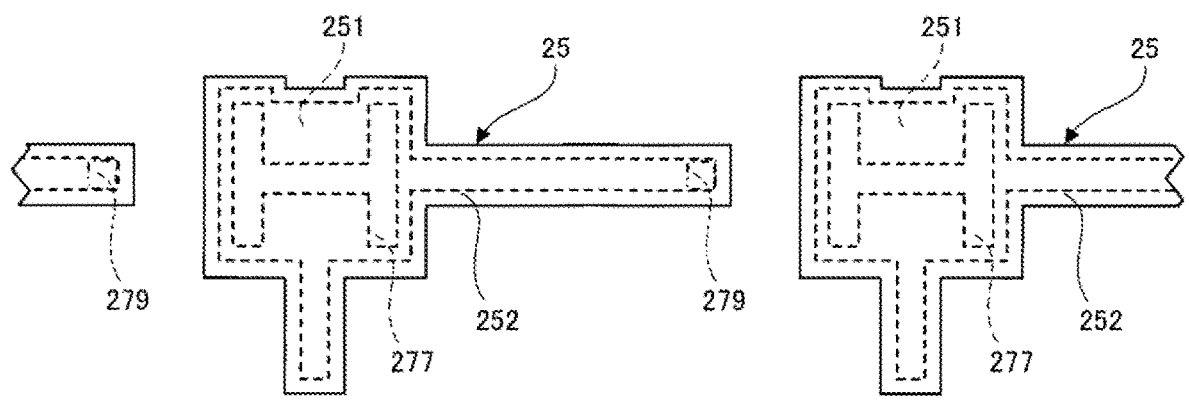
FIG. 10 is a plan view for explaining the contact unit used to couple the first capacitor and a pixel electrode of the exemplary embodiment.

FIG. 10 is a plan view for explaining the contact unit 279 used to couple the first capacitor 25 and the pixel electrode 28 in the exemplary embodiment. As illustrated in FIG. 10, the contact unit 279 is arranged on the second electrode 252 of the first capacitor 25. The contact unit 279 is arranged in a position that does not overlap the second capacitor 26 in a plan view, as illustrated in FIG. 9.

Figure 11:
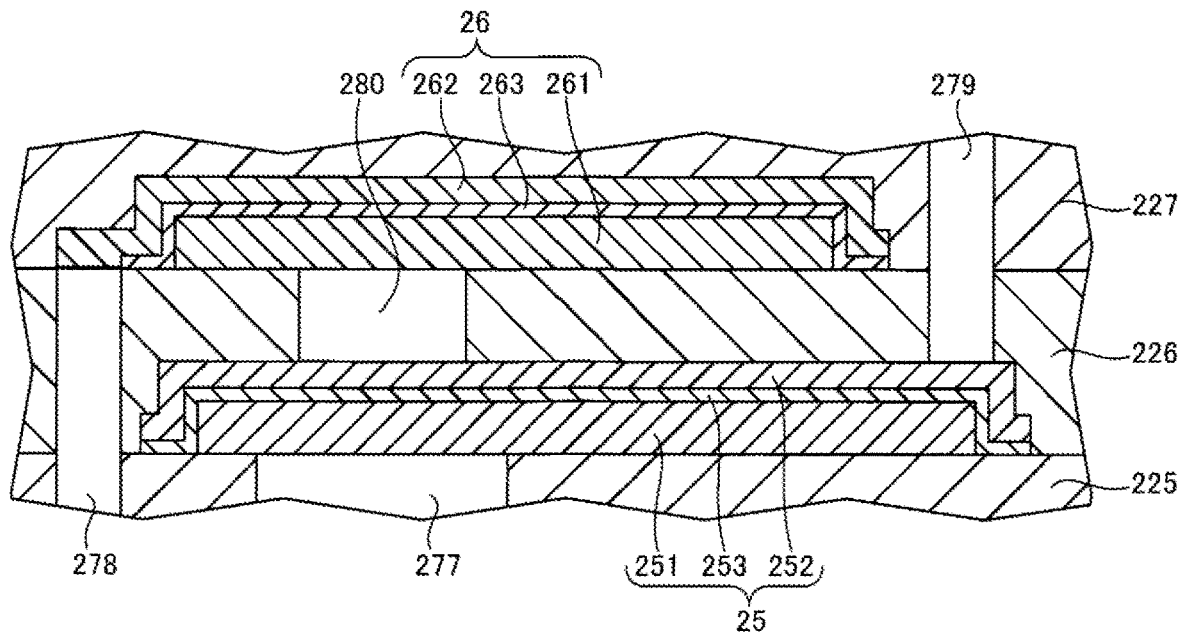
FIG. 11 is a cross-sectional view illustrating a layer configuration of the first capacitor and the second capacitor of the exemplary embodiment.

FIG. 11 is a cross-sectional view illustrating a layer configuration of the first capacitor 25 and the second capacitor 26 of the exemplary embodiment. As illustrated in FIG. 11, in the first capacitor 25, the second electrode 252 includes a portion facing a side surface of the first electrode 251, and the dielectric layer 253 is arranged between the portion and the first electrode 251. According to this arrangement, the electrostatic capacity of the first electrode 25 is increased compared to a case where this arrangement is not made. Similarly, in the second capacitor 26, the fourth electrode 262 includes a portion facing a side surface of the third electrode 261, and the dielectric layer 263 is arranged between the portion and the third electrode 261.

Further, the first capacitor 25 and the second capacitor 26 each have a shape extending along a flat surface, that is, a flat plate shape. As a result, compared to a case where a capacitor is formed in a recessed portion as in Japanese Utility Model No. 3,199,692, a thickness of the first capacitor 25 and the second capacitor 26 can be reduced. Note that the first capacitor 25 and the second capacitor 26 may form a shape other than a flat plate shape and, for example, when the insulating layer 225 or 226 includes a recessed portion, a portion arranged in the recessed portion may be included.

The electro-optical device 1 described above includes the base member 21, the pixel electrode 28, the insulating layer 225 serving as the first layer having insulating properties, the insulating layer 226 serving as the second layer having insulating properties, the insulating layer 227 serving as the third layer having insulating properties, the first capacitor 25, the second capacitor 26, and the transistor 23, as described above.

Here, the insulating layer 225 is arranged between the base member 21 and the pixel electrode 28. The insulating layer 226 is arranged between the pixel electrode 28 and the insulating layer 225. The insulating layer 227 is arranged between the pixel electrode 28 and the insulating layer 226. The first capacitor 25 is arranged between the insulating layer 225 and the insulating layer 226, and includes the first electrode 251, and the second electrode 252 arranged between the insulating layer 226 and the first electrode 251. The second capacitor 26 is arranged between the insulating layer 226 and the insulating layer 227, and includes the third electrode 261, and the fourth electrode 262 arranged between the insulating layer 227 and the third electrode 261. The transistor 23 is arranged between the base member 21 and the insulating layer 225, and includes the source area 231a serving as a source electrode, the drain area 231b serving as a drain electrode, and the gate electrode 232.

In particular, the second electrode 252 of the first capacitor 25 is coupled to the drain area 231b via the third electrode 261 of the second capacitor 26. As a result, compared to a case where the second electrode 252 and the third electrode 261 are each directly coupled to the drain area 231b, a fewer number of contact units are needed. From this same perspective, the third electrode 261 of the second capacitor 26 is coupled to the pixel electrode 28 via the second electrode 252 of the first capacitor 25. As a result, compared to a case where the second electrode 252 and the third electrode 261 are each directly coupled to the pixel electrode 28, the number of contact units can be smaller. Further, compared to a case where one electrode is shared to form two capacitors, such as in Japanese Utility Model No. 3,199,692, the structure for coupling to the drain area 231b and the pixel electrode 28 has minimal impact on the electrostatic capacity of the first capacitor 25 and the second capacitor 26, making it possible to increase the electrostatic capacity of the first capacitor 25 and the second capacitor 26 accordingly.

With the second electrode 252 and the third electrode 261 thus electrically coupled to the drain area 231b and the pixel electrode 28, the electrostatic capacities of the first capacitor 25 and the second capacitor 26 can be increased while decreasing the surface areas and the thicknesses of the first capacitor 25 and the second capacitor 26. As a result, an aperture ratio of the element substrate 2 can be increased, and a display quality of the electro-optical device 1 can be enhanced.

According to the exemplary embodiment, the second electrode 252 faces an extensive range of the first electrode 251, including not only a main face, but a side face as well. As a result, compared to a configuration in which only the main faces of the first electrode 251 and the second electrode 252 face each other, the facing surface areas of the first electrode 251 and the second electrode 252 can be increased. Similarly, the fourth electrode 262 faces an extensive range of the third electrode 261, including not only a main face, but a side face as well. As a result, compared to a case where only the main faces of the third electrode and the fourth electrode face each other, the facing surface areas of the third electrode 261 and the fourth electrode 262 can be increased. Accordingly, from this point as well, the electrostatic capacities of the first capacitor 25 and the second capacitor 26 can be increased. Here, the second electrode 252 may face 80% or more of the surface area of the side surface of the first electrode 251. Similarly, the fourth electrode 262 may face 80% or more of the surface area of the side surface of the third electrode 261.

In the exemplary embodiment, the first capacitor 25 and the second capacitor 26 include portions that overlap one another in a plan view from a thickness direction of the base member 21. As a result, compared to a case where the first capacitor 25 and the second capacitor 26 do not overlap in a plan view, the surface area occupied by the entire first capacitor 25 and the second capacitor 26 in a plan view can be decreased. The reason that the first capacitor 25 and the second capacitor 26 can thus be arranged overlapping in a plan view is that the first capacitor 25 and the second capacitor 26 are arranged between mutually different layers. Here, 50% or more of the surface area of one of the first capacitor 25 and the second capacitor 26 may overlap the other one, and 80% or more of one of the first capacitor 25 and the second capacitor 26 may overlap the other one. Note that the first capacitor 25 and the second capacitor 26 may not include portions that overlap one another in a plan view.

Further, the electro-optical device 1, as described above, further includes a capacitance line 245 serving as a reference potential wiring arranged between the base member 21 and the insulating layer 225 and coupled to a reference potential. Here, the first electrode 251 is coupled to the fourth electrode 262 of the second capacitor 26 via the capacitance line 245. As a result, the first electrode 251 and the fourth electrode 262 can be set as reference potentials. Further, because other elements of the first capacitor 25 and the second capacitor 26 are interposed between the first electrode 251 and the fourth electrode 262 serving as reference potentials, the first capacitor 25 and the second capacitor 26 can be electromagnetically shielded. Note that the interlayer where the capacitance line 245 is arranged is not limited to between the base member 21 and the insulating layer 225, and may be another interlayer of the dielectric body 22. Further, the number of layers of the dielectric body 22 is not limited to the number illustrated, and may be 10 or more layers, for example.

Furthermore, the electro-optical device 1, as described above, further includes the insulating layer 224 serving as the fourth layer having insulating properties, and the scanning line 244 electrically coupled to the gate electrode 232 of the transistor 23. Here, the insulating layer 224 is arranged between the base member 21 and the insulating layer 225. The scanning line 244 is arranged between the base member 21 and the insulating layer 224, and more specifically between the insulating layer 223 and the insulating layer 224. The capacitance line 245 serving as a reference potential wiring is arranged between the insulating layer 225 and the insulating layer 224. As a result, the couplings between the gate 232 and the drain area 231b can be reduced. Note that the interlayer where the scanning line 244 is arranged can achieve the advantages described above as long as the interlayer is between the base member 21 and the insulating layer 224. Further, the interlayer where the scanning line 244 is arranged is not limited to between the insulating layer 223 and the insulating layer 224, and may be another interlayer of the dielectric body 22. Further, the positional relationship of the scanning line 244 and the capacitance line 245 is not limited to the foregoing relationship, and may be a positional relationship opposite to the foregoing relationship.

Further, the electro-optical device 1 further includes the insulating layer 228 serving as the fifth layer having insulating properties arranged between the pixel electrode 28 and the insulating layer 227, and the signal line 246 arranged between the insulating layer 227 and the insulating layer 228 and electrically coupled to the source area 231a. As a result, the couplings between the source area 231a and the drain area 231b can be reduced. Further, the interlayer where the signal line 246 is arranged is not limited to between the insulating layer 227 and the insulating layer 228, and may be another interlayer of the dielectric body 22.

Further, the electro-optical device 1 may be configured to include a contact unit that penetrates the insulating layer 227 and the insulating layer 228 at a position overlapping with the contact unit 278 in a plan view, and electrically couples the fourth electrode 262 and the shield layer 248. The first electrode 251, the fourth electrode 262, and the shield layer 248 can serve as reference potentials, making it possible to enhance a crosstalk suppressing effect. Further, in this configuration, the shield layer 248 and the capacitance line 245 may be configured to be electrically coupled via a contact unit, in the peripheral area A20. With this configuration, a configuration in which the contact unit 278 may not be disposed.

2. Electronic Apparatus

The electro-optical device can be used for various electronic apparatuses.

Figure 12:
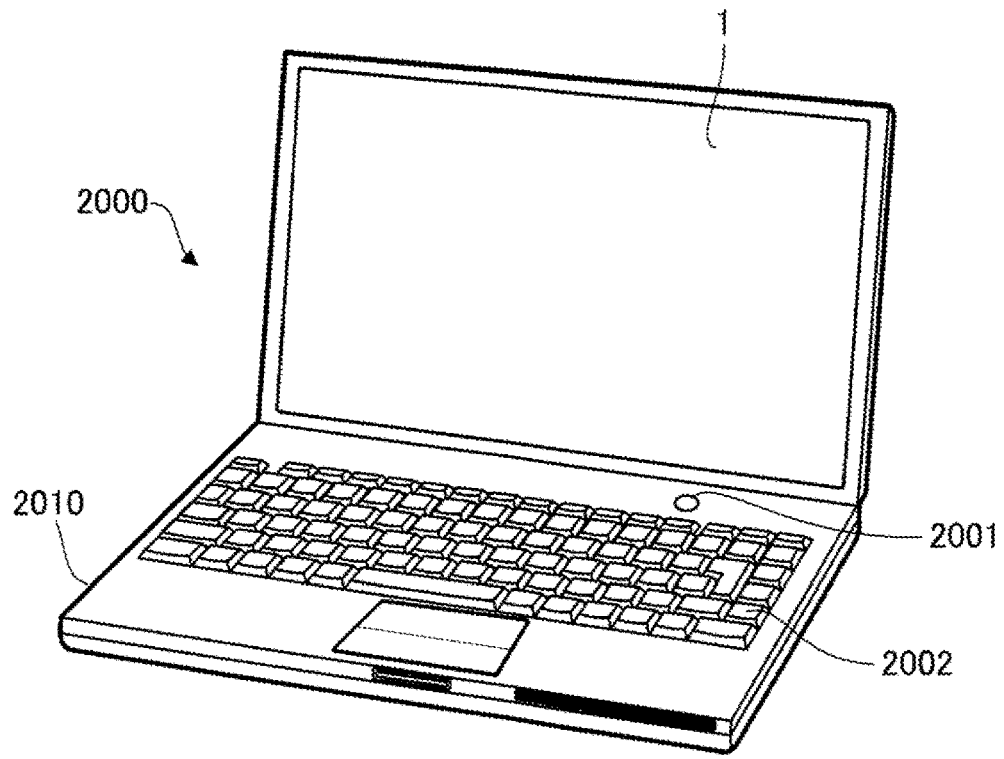
FIG. 12 is a perspective view illustrating a personal computer as one example of an electronic apparatus.

FIG. 12 is a perspective view illustrating a personal computer as one example of an electronic apparatus. A personal computer 2000 includes the electro-optical device 1 that displays various images, and a main body unit 2010 provided with a power source switch 2001 and a keyboard 2002.

Figure 13:
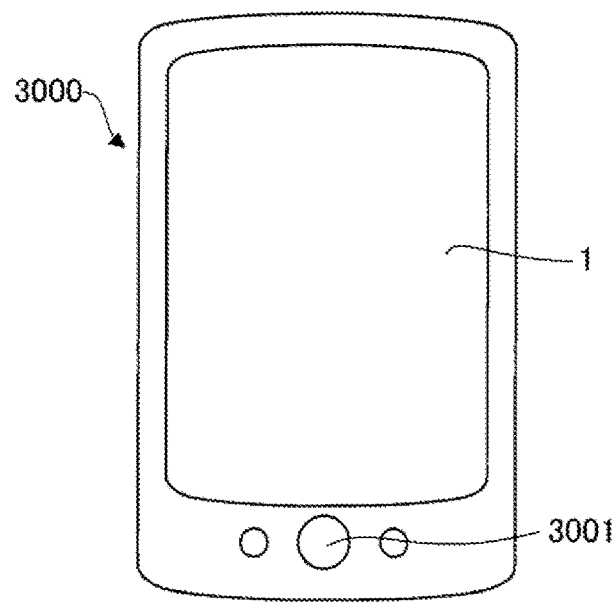
FIG. 13 is a perspective view illustrating a smartphone as one example of the electronic apparatus.

FIG. 13 is a perspective view illustrating a smartphone as one example of the electronic apparatus. A smartphone 3000 includes an operation button 3001, and the electro-optical device 1 that displays various images. The screen contents displayed on the electro-optical device 1 are changed in accordance with an operation of the operation button 3001.

Figure 14:
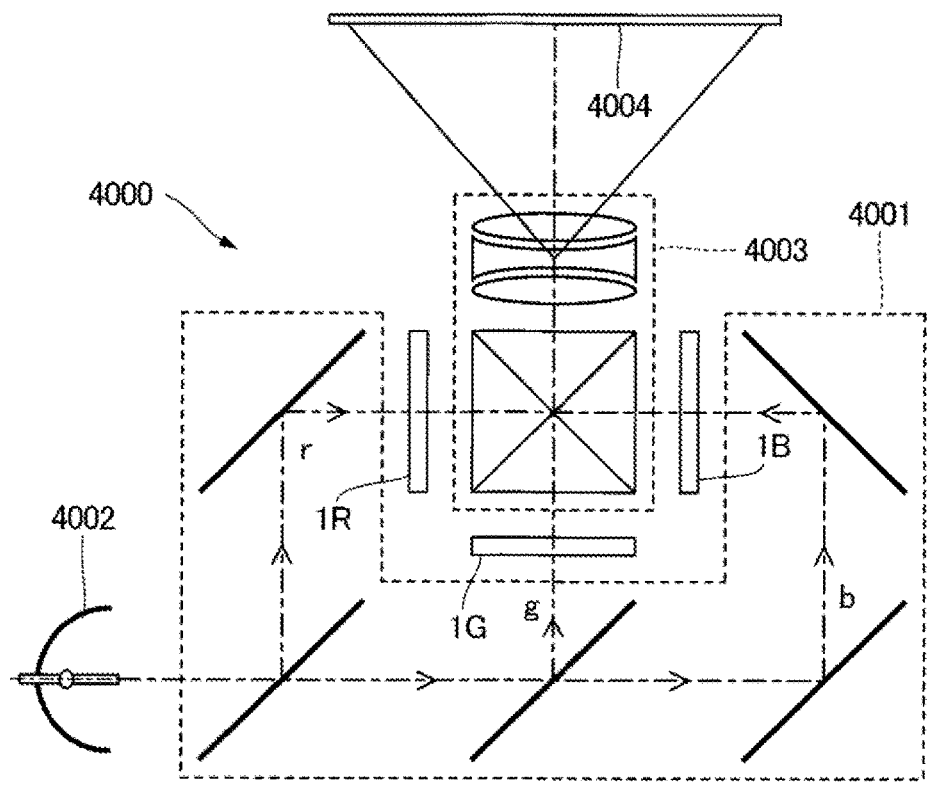
FIG. 14 is a schematic view illustrating a projector as one example of the electronic apparatus.

FIG. 14 is a schematic view illustrating a projector as one example of the electronic apparatus. A projection-type display apparatus 4000 is a three-plate type projector, for example. An electro-optical device 1R is the electro-optical device 1 corresponding to a red display color, an electro-optical device 1G is the electro-optical device 1 corresponding to a green display color, and an electro-optical device 1B is the electro-optical device 1 corresponding to a blue display color. That is, the projection-type display apparatus 4000 includes the three electro-optical devices 1R, 1G, 1B respectively corresponding to red, green, and blue display colors.

An illumination optical system 4001 supplies a red color component r of light emitted from a lighting apparatus 4002 serving as a light source to the electro-optical device 1R, supplies a green color component g of the light to the electro-optical device 1G, and supplies a blue color component b of the light to the electro-optical device 1B. Each electro-optical device 1R, 1G, 1B functions as an optical modulator of a light valve or the like that modulates each monochromatic light in accordance with a display image, the monochromatic light being supplied from the illumination optical system 4001. A projection optical system 4003 combines the light emitted from each of electro-optical devices 1R, 1G, 1B, and projects the combined light to a projection surface 4004.

The personal computer 2000, the smartphone 3000, and the projection-type display apparatus 4000 described above each include the electro-optical device 1 described above. As a result, the display quality of the personal computer 2000, the smartphone 3000, and the projection-type display apparatus 4000 can be enhanced.

Note that examples of the electronic apparatus to which the present disclosure is applied are not limited to the illustrated apparatuses, and may include, for example, a Personal Digital Assistant (PDA), a digital still camera, a television, a video camera, a car navigation system, an indicator for a vehicle, an electronic notebook, an electronic paper, a calculator, a word processor, a workstation, a visual telephone, and a Point of sale (POS) terminal, or the like. Furthermore, examples of the electronic apparatus to which the present disclosure is applied include a printer, a scanner, a copier, a video player, devices provided with a touch panel, and the like.

While the above has described the electro-optical device and the electronic apparatus according to the present disclosure based on preferred exemplary embodiments, the present disclosure is not limited to the exemplary embodiments described above. Further, the configuration of each component of the present disclosure may be replaced with any configuration that exerts the equivalent functions of the above-described exemplary embodiments, and to which any configuration may be added.

Further, in the explanation described above, the liquid crystal display device was described as an example of the electro-optical device of the present disclosure, but the electro-optical device of the present disclosure is not limited to the liquid crystal display device. That is, the electro-optical device need only be an electro-optical device in which the optical characteristics change according to the electric power. For example, the present disclosure may also be applied in the same manner as the exemplary embodiment described above to a display panel that uses a light emitting element such as organic electro luminescence (EL), inorganic EL, or a light emitting polymer.

Further, the present disclosure may also be applied in the same manner as the exemplary embodiment described above to an electrophoretic display panel that uses a microcapsule including a pigmented liquid and white particles dispersed in the liquid.

Further, while the description above used the TFT as an example of the transistor, the transistor is not limited to the TFT, and may be a metal-oxide-semiconductor field-effect transistor (MOSFET) or the like, for example.

Further, the electro-optical device of the present disclosure is not limited to a transmissive type, and may be a reflective type.

What is claimed is:

1. An electro-optical device comprising:
a base member;
a pixel electrode;
a first layer having insulating properties and arranged between the base member and the pixel electrode;
a second layer having insulating properties and arranged between the pixel electrode and the first layer;
a third layer having insulating properties and arranged between the pixel electrode and the second layer;
a first capacitor arranged between the first layer and the second layer and including a first electrode and a second electrode arranged between the second layer and the first electrode;
a second capacitor arranged between the second layer and the third layer and including a third electrode and a fourth electrode arranged between the third layer and the third electrode;
a transistor arranged between the base member and the first layer and including a source electrode, a drain electrode, and a gate electrode;
a fourth layer having insulating properties and arranged between the base member and the first layer;
a scanning line arranged between the base member and the fourth layer and electrically coupled to the gate electrode;
a fifth layer having insulating properties and arranged between the pixel electrode and the third layer;
a signal line arranged between the third layer and the fifth layer and electrically coupled to the source electrode; and
a reference potential wiring coupled to a reference potential, the reference potential wiring being arranged between the base member and the first layer and between the first layer and the fourth layer,
wherein the first electrode is coupled to the fourth electrode via the reference potential wiring,
the second electrode is coupled to the drain electrode via the third electrode without being directly coupled to the drain electrode, and
the third electrode is coupled to the pixel electrode via the second electrode without being directly coupled to the pixel electrode.

2. The electro-optical device according to claim 1, wherein the first capacitor and the second capacitor include portions that overlap in a plan view from a thickness direction of the base member.

3. An electronic apparatus comprising the electro-optical device according to claim 1.

* * * * *